US 8,460,808 B2

(12) United States Patent
Toia et al.

(10) Patent No.: US 8,460,808 B2
(45) Date of Patent: Jun. 11, 2013

(54) RECHARGEABLE LITHIUM BATTERIES COMPRISING MEANS FOR THE SORPTION OF HARMFUL SUBSTANCES

(75) Inventors: Luca Toia, Carnago VA (IT); Johnny Mio Bertolo, Fiume Veneto PN (IT); Giorgio Longoni, Monza MI (IT); Marco Amiotti, Carnaredo MI (IT)

(73) Assignee: Saes Getters S.p.A., Lainate (MI) (IT)

( * ) Notice: Subject to any disclaimer, the term of this patent is extended or adjusted under 35 U.S.C. 154(b) by 628 days.

(21) Appl. No.: 12/600,461

(22) PCT Filed: Jun. 4, 2008

(86) PCT No.: PCT/EP2008/056882
§ 371 (c)(1),
(2), (4) Date: Nov. 16, 2009

(87) PCT Pub. No.: WO2008/148781
PCT Pub. Date: Dec. 11, 2008

(65) Prior Publication Data
US 2010/0173192 A1 Jul. 8, 2010

(30) Foreign Application Priority Data
Jun. 5, 2007 (IT) .............................. MI2007A1147

(51) Int. Cl.
*H01M 10/34* (2006.01)
(52) U.S. Cl.
USPC ............. 429/57; 429/145; 429/163; 429/167; 429/309; 429/231.95
(58) Field of Classification Search
USPC .................. 429/57, 135, 145, 163, 164, 167, 429/309, 220, 231.3, 232, 231.95
See application file for complete search history.

(56) References Cited

U.S. PATENT DOCUMENTS

| 4,448,860 | A | | 5/1984 | Von Alpen et al. |
| 4,830,643 | A | | 5/1989 | Sassa et al. |
| 5,091,223 | A | | 2/1992 | Mori et al. |
| 5,264,301 | A | * | 11/1993 | Sindorf et al. ................. 429/53 |
| 5,445,856 | A | | 8/1995 | Chaloner-Gill |
| 5,743,942 | A | | 4/1998 | Shelley et al. |
| 6,063,307 | A | | 5/2000 | Shepodd et al. |

(Continued)

FOREIGN PATENT DOCUMENTS

| EP | 0 605 734 | 7/1994 |
| EP | 1 107 336 | 6/2001 |

(Continued)

OTHER PUBLICATIONS

PCT International Search Report for PCT/EP2008/056879 filed on Jun. 4, 2008 in the name of SAES GETTERS S.P.A.

(Continued)

*Primary Examiner* — Patrick Ryan
*Assistant Examiner* — Ben Lewis
(74) *Attorney, Agent, or Firm* — Steinfl & Bruno, LLP

(57) ABSTRACT

Rechargeable lithium batteries are described, comprising an airtight container, electrodes immersed in an electrolytic solution and spaced apart by means of one or more separators, electrical contacts connected to the electrodes and means (10) for sorbing harmful substances, the means comprising a polymeric housing (11, 12) being permeable to said harmful substances but impermeable to the electrolyte and containing one or more getter materials (14) for the sorption of said harmful substances.

30 Claims, 3 Drawing Sheets

U.S. PATENT DOCUMENTS

| | | | |
|---|---|---|---|
| 6,428,612 | B1 | 8/2002 | McPhilmy et al. |
| 6,503,659 | B1* | 1/2003 | Ovshinsky et al. ........ 429/218.2 |
| 7,776,465 | B1* | 8/2010 | Hatazawa et al. ............... 429/57 |
| 2002/0164441 | A1 | 11/2002 | Amine et al. |
| 2003/0049519 | A1* | 3/2003 | Ishida et al. .................... 429/57 |
| 2004/0054057 | A1 | 3/2004 | Bauer et al. |
| 2005/0069763 | A1* | 3/2005 | Hong et al. ................... 429/185 |
| 2005/0130044 | A1* | 6/2005 | Aoshima et al. .............. 429/324 |
| 2006/0073365 | A1* | 4/2006 | Kaye .............................. 429/19 |
| 2006/0286448 | A1 | 12/2006 | Snyder et al. |
| 2007/0042264 | A1 | 2/2007 | Desilvestro et al. |
| 2007/0254209 | A1 | 11/2007 | Baba et al. |
| 2008/0121105 | A1* | 5/2008 | Schubert et al. ................ 95/139 |

FOREIGN PATENT DOCUMENTS

| | | |
|---|---|---|
| EP | 1107336 | 6/2001 |
| EP | 1990848 | 2/2008 |
| JP | 11-307131 | 11/1999 |
| JP | 2001-155790 | 8/2001 |
| JP | 2003-077549 | 3/2003 |
| JP | 2003/197487 | 11/2003 |
| WO | 2005/067645 | 7/2005 |
| WO | 2005/107334 | 11/2005 |
| WO | 2007/066372 | 6/2007 |
| WO | 2007/080614 | 7/2007 |

OTHER PUBLICATIONS

PCT Written Opinion for PCT/EP2008/056879 filed on Jun. 4, 2008 in the name of SAES GETTERS S.P.A.

PCT International Preliminary Report on Patentability for PCT/EP2008/056879 filed on Jun. 4, 2008 in the name of SAES GETTERS S.P.A.

PCT International Search Report for PCT/EP2008/056882 filed on Jun. 4, 2008 in the name of SAES GETTERS S.P.A.

PCT International Written Opinion for PCT/EP2008/056882 filed on Jun. 4, 2008 in the name of SAES GETTERS S.P.A.

PCT International Preliminary Report on Patentability for PCT/EP2008/056882 filed on Jun. 4, 2008 in the name of SAES GETTERS S.P.A.

Kumai, K., et al. Gas generation mechanism due to electrolyte decomposition in commercial lithium-ion cell. Journal of Power Sources, 81-82, pp. 715-719 (2009).

Vetter, J., et al. In situ study on $CO_2$ evolution at lithium-ion battery cathodes. Journal of Power Sources, 159, pp. 277-281 (2006).

Chinese Office Action mailed on Dec. 16, 2011 issued for Chinese Application 200880018895.4 filed Nov. 16, 2009 in the name of SAES GETTERS S.P.A.(Chinese + English).

Response to Chinese Office Action issued on Dec. 16, 2011 for Chinese Application 2008001895.4 filed Nov. 16, 2009 in the name of SAES GETTERS S.P.A.(Chinese + English).

European Communication 94(3) mailed on Dec. 28, 2011 issued for European Application 08760465.8 filed on Nov. 16, 2009 in the name of SAES GETTERS S.P.A.

Response submitted on Mar. 13, 2012 to EP Communication 94(3) mailed on Dec. 28, 2011 issued for European Application 08760465.8 filed on Nov. 16, 2009 in the name of SAES GETTERS S.P.A.

European Communication 94(3) mailed on Jan. 27, 2011 issued for European Application 08760465.8 filed on Nov. 16, 2009 in the name of SAES GETTERS S.P.A.

Response submitted on Apr. 11, 2011 to EP Communication 94(3) mailed on Dec. 27, 2011 issued for European Application 08760465.8 filed on Nov. 16, 2009 in the name of SAES GETTERS S.P.A.

European Communication 94(3) mailed on Apr. 8, 2010 issued for European Application 08760465.8 filed on Nov. 16, 2009 in the name of SAES GETTERS S.P.A.

Response submitted on Jun. 8, 2010 to EP Communication 94(3) mailed on Apr. 8, 2011 issued for European Application 08760465.8 filed on Nov. 16, 2009 in the name of SAES GETTERS S.P.A.

Restriction Requirement mailed on Sep. 21, 2012 issued for U.S. Appl. No. 12/600,454, filed Nov. 16, 2009 in the name of Luca Toia et al.

* cited by examiner

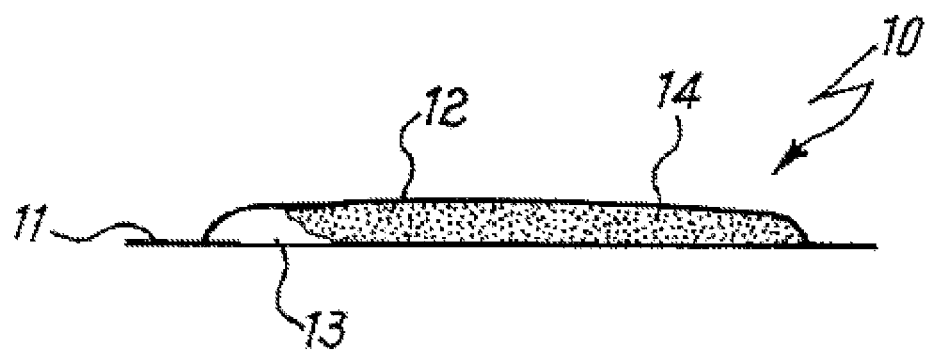
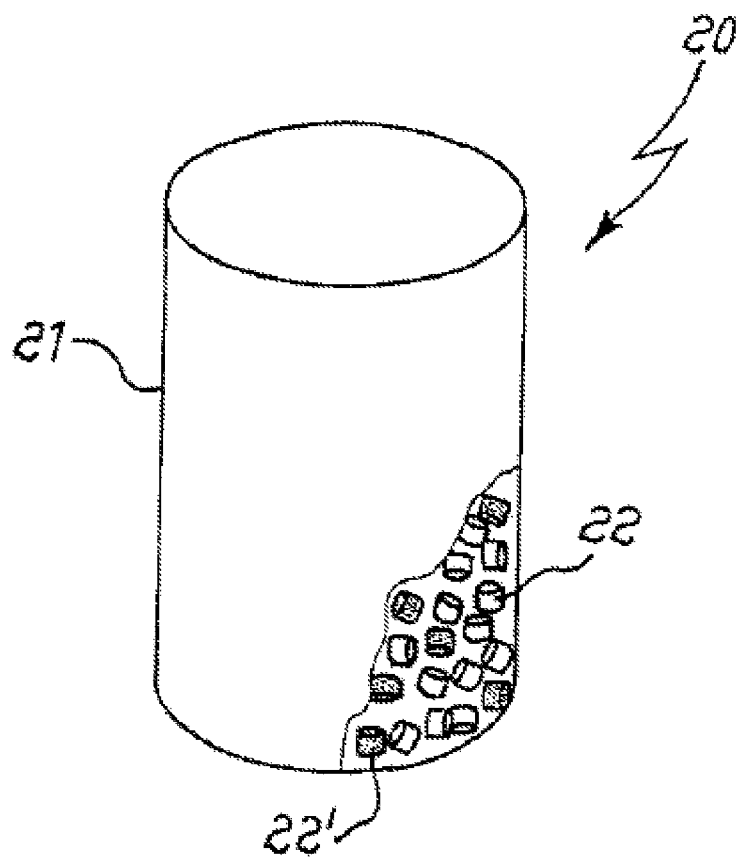

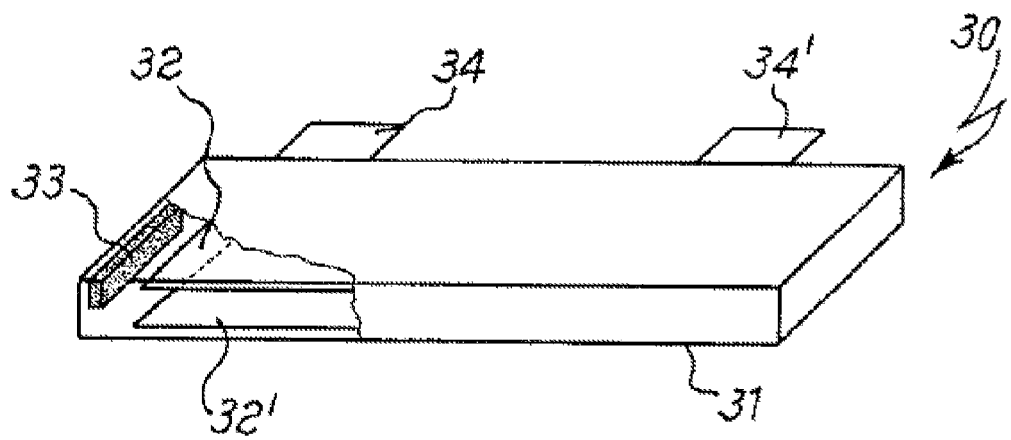
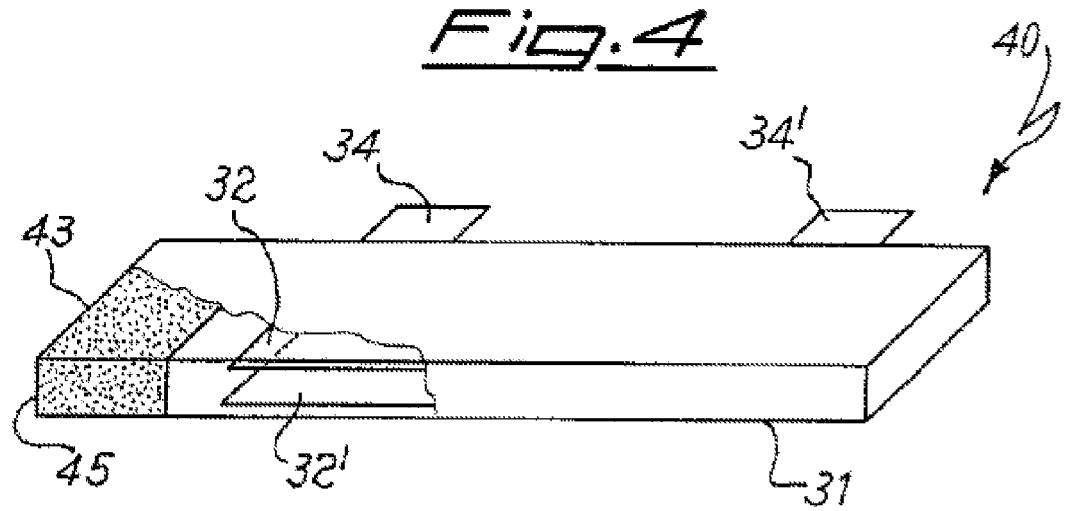

RECHARGEABLE LITHIUM BATTERIES COMPRISING MEANS FOR THE SORPTION OF HARMFUL SUBSTANCES

CROSS REFERENCE TO RELATED APPLICATIONS

The present application is the national stage of International Application PCT/EP2008/056882 filed on Jun. 4, 2008 which, in turn, claims priority to Italian Application MI2007A001147, filed on Jun. 5, 2007. The present application may also be related to U.S. patent application Ser. No. 12/600,454 which, in turn, is the National Stage of International Application PCT/EP2008/056879.

The present invention relates to rechargeable lithium batteries containing means capable of sorbing the harmful substances generated by these batteries during their use.

Rechargeable lithium batteries are used in several electronic devices thanks to their greater capacity and power and energy density. Recent developments of these batteries that have further improved their performances allow their use also in hybrid or totally electric vehicles.

Rechargeable lithium batteries and their operation principle are widely known. In particular a lithium battery comprises two electrodes (anode and cathode) spaced apart by means of a separator and immersed in an electrolyte. The oxidation reaction occurs on the anode and allows to release electrons into the electric circuit, whereas the reduction reaction occurs on the cathode and allows to reintroduce electrons into the battery through the electric circuit. The electrolyte has the purpose of completing the electric circuit of the battery by allowing the ions transportation from one electrode to the other, whereas the separator has the function of preventing a short-circuit between cathode and anode.

Therefore, lithium batteries are essentially comprised of an airtight container inside which are arranged electrodes (anode and cathode) immersed or impregnated with special electrolytic solutions and spaced apart by means of a separator, and electrical contacts communicating a portion of these electrodes with the outside of the battery.

As to the cathode, a 20 μm thick aluminum sheet is typically coated with oxides such as $LiCoO_2$, $LiNiO_2$, $LiMn_2O_4$, $LiFePO_4$, also mixed oxides of Ni and Co according to the formula $LiCo_xNi_{1-x}O_2$ may be employed for this purpose. While the anode is typically made of a copper sheet coated with graphite. In the rest of the description of the invention anode and cathode will no longer be distinguished, but these elements will be generically identified with the term electrode.

As to electrolytic solutions, these are typically formed of an organic solvent and a ionic salt. As to the ionic salt, lithium hexafluorophosphate ($LiPF_6$) is mostly used, whereas as solvents mostly used are propylene carbonate (PC), dimethyl carbonate (DMC), diethyl carbonate (DEC), ethyl carbonate (EC) and dimethyl ethane (DME) alone, or more commonly a mixture of two or more components chosen among these.

The separator is generally made of a porous polymeric material that is permeable to lithium ions.

Harmful substances, being often in a gaseous form, may be generated inside lithium batteries during their use, which may damage the batteries even in an irreparable manner. Another possible source of harmful substances may be due to the desorption of some materials used inside the battery. More details about the mechanisms generating harmful species inside lithium batteries may be found in the article "Gas generation mechanism due to electrolyte decomposition in commercial lithium-ion cell", by Kumai et. al. published in 1999 on the Journal of Power Sources, pages 715-719, and in the article "In situ study on $CO_2$ evolution at lithium-ion battery cathodes", by Vetter et al., published in 2006 on the Journal of Power Sources, pages 277-281.

Carbon dioxide ($CO_2$), carbon monoxide (CO), saturated and unsaturated hydrocarbons, oxygen ($O_2$) and hydrofluoric acid (HF) are among the most harmful gaseous species, whereas water ($H_2O$), which is another very harmful species, is typically present in liquid phase dissolved in the electrolytic solution. $CO_2$ too may be present in liquid phase, although the major risks associated to its presence inside the battery are due to its gaseous phase.

In the lithium batteries made according to the prior art, getter materials are used for the manufacturing of composite barriers, i.e. their function is to prevent impurities from entering the electrochemical cell rather than sorbing the gases present or generated therein.

In particular, patent application US 2007/0042264 mentions the presence of barrier layers for the sorption of $H_2O$ in the area where the battery is sealed, while in this document the presence of getter materials in lithium batteries is said to be useful without describing the methods for introducing these materials inside the electrochemical device.

The possible use of barrier layers made of getter materials inside lithium batteries is also described in patent application WO 2005/067645 and in patent application US 2006/0286448.

All these solutions do not tackle the problem of the compatibility between the getter material and the electrolyte. The getter material must in fact be completely inert to the electrolyte, both in order not to jeopardize its sorbing properties and in order not to release substances being harmful for the battery operation as a consequence of the reaction between the getter material and the electrolyte. Such a compatibility must also be ensured after the getter material has carried out its function by bonding to harmful species present inside the battery.

Moreover, the solutions of the prior art can prevent or slow down the ingress of harmful substances inside the battery, but they are not efficient as to the sorption of the harmful substances generated or present inside the same battery.

In a first aspect thereof the present invention relates to a rechargeable lithium battery being able to overcome the problems still present in the prior art, and it particularly consists in a rechargeable lithium battery comprising an airtight container, electrodes immersed in an electrolytic solution, said electrodes being spaced apart by means of one or more separators, electrical contacts connected to the electrodes and a means for sorbing harmful substances, characterized in that said means for sorbing harmful substances comprises a polymeric housing being permeable to said harmful substances but impermeable to the electrolyte and containing one or more getter materials for the sorption of said harmful substances.

The invention will be described with reference to the following drawings, wherein:

FIG. 1 shows a means for the sorption of harmful substances in rechargeable lithium batteries according to the present invention;

FIG. 2 shows another embodiment of a means for the sorption of harmful substances in rechargeable lithium batteries of the invention;

FIG. 3 shows a sectional (broken) view of a rechargeable lithium battery comprising a permeable polymeric container containing getter materials;

FIG. 4 shows an alternative embodiment of the rechargeable lithium battery shown in FIG. 3;

Figure 5:
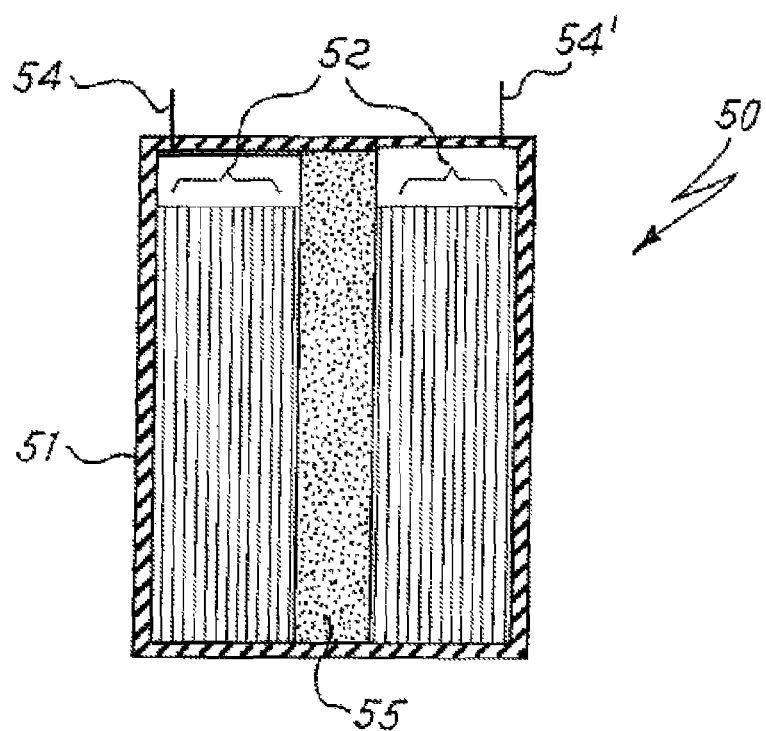
FIG. 5 shows a longitudinal-sectional view of a rechargeable lithium battery having a different shape and comprising a permeable polymeric housing containing getter materials.

The size and the dimensional ratios of the various members shown in the drawings are not correct, but have been altered in order to help understanding the drawings themselves. Moreover, still for the same reason, some characteristic components of the batteries, such as for example the separators arranged between the electrodes, have not been shown.

International patent application WO 2007/080614 in the applicant's name shows an electrolytic capacitor comprising a sorber of impurities made of a polymeric housing being permeable to the harmful substances but impermeable to the electrolyte and containing one or more getter materials for the sorption of said harmful substances, which sorber, rather than being employed in a rechargeable lithium battery, is used in a different device for storing energy (electrolytic capacitor).

FIG. 1 shows a means 10 for the sorption of harmful substances, comprised of two polymeric sheets 11 and 12 welded to each other and defining a cavity 13 containing powders of one or more getter materials 14.

At least one and preferably both the materials forming the polymeric sheets 11, 12 are permeable to the harmful substances but impermeable to the electrolyte, thus accomplishing a protective action with respect to the getter material. This allows to employ a general technical solution to the problem of removing harmful substances in rechargeable lithium batteries, the solution being not bound to the type of electrolyte used inside the battery.

The thickness of the polymeric sheets 11, 12 is a very important parameter for carrying out the invention, as it is necessary that these sheets are thin in order to allow an effective permeation of the harmful substances, but at the same time the sheets must be thick enough to prevent them from breaking and to avoid the consequent loss of getter material.

In order to satisfy these contrasting requirements it has been determined that the thickness of the polymeric sheets is comprised between 2 and 50 µm and preferably between 5 and 15 µm. In a preferred embodiment the two polymeric sheets have the same thickness.

Means for the sorption of harmful substances for the use in rechargeable lithium batteries having a structure similar to that described in FIG. 1 might also be obtained by using a single polymeric sheet folded on itself along a line, thus forming one side of the means and being welded along the other side or the other sides in order to form a closed cavity completely similar to cavity 13. Moreover by doing so the previously described preferred embodiment is obtained, i.e. sheets 11 and 12 have the same thickness and the same permeability.

When the means for sorbing the harmful substances is arranged along one of the inner walls of the rechargeable lithium battery, it is possible to use a higher thickness for the sheet contacting said wall, as there is no permeation of harmful substances along the contact surface between the getter system and the battery wall.

The getter materials contained in the polymeric housing are preferably in the form of powders, with a size comprised between 10 and 60 µm. It also possible that the getter material is used in the form of pills formed of compressed powders. Such an embodiment is useful when a larger amount of getter material must be introduced into the battery.

FIG. 2 shows a system 20 for the sorption of harmful substances, wherein two different getter materials 22, 22' are introduced in the form of pills enclosed in a cylindrical housing 21 made of a polymeric material permeable to the harmful substances. A variation of the system of FIG. 2 is a single pill formed of getter material powders enclosed in a (generically cylindrical) polymeric housing, permeable to the harmful substances, in direct contact with the surface of the pill; a similar sorbing means (not shown in the drawings) can find application in batteries of suitable shape, e.g. button-like batteries.

Getter materials in permeable polymeric housings used in other applications and fields are known and described for instance in patents U.S. Pat. Nos. 4,830,643, 5,743,942 and 6,428,612.

As to the materials forming the permeable polymeric housing, the inventors have found that suitable materials for carrying out the invention are polyolefins, in particular polyethylenes, and more in particular low density polyethylene (LDPE), polypropylene (PP), polystyrene and thermoplastic olefins (TPE), or fluorinated polymers such as polytetrafluorethylene (PTFE). Another polymeric material that may be used is ethyl-vinyl-acetate (EVA).

According to the present invention, the getter materials employed in the means for removing harmful substances are of various types, depending on the harmful substances to be removed from the battery. The nature of these substances, for each type of lithium battery, may be determined through preliminary tests carried out on batteries being not provided with means for the removal of harmful substances.

When the harmful substance is $H_2O$ it is possible to use oxides of alkaline-earth metals (preferred oxides of this type are magnesium and calcium oxides), boron oxide or zeolites of various nature.

When the harmful substance is carbon dioxide, suitable getter materials for carrying out the invention are carbon molecular sieves (CMS), hydroxides of alkaline and alkaline-earth metals (lithium and sodium in particular), lithium salts like $LiXO_y$, with X chosen among zirconium, iron, nickel, titanium, silicon and y comprised between 2 and 4. MOF (Metal Organic Framework) suitably modified by means of the addition of basic functional groups, such as aminic groups. In some cases, such as when the hydroxides of alkaline and alkaline earth metals are use for the $CO_2$ removal it is particularly useful to employ also a $H_2O$ removal getter material.

When the harmful substance is carbon monoxide in the gaseous phase, cobalt (II, III) oxide $Co_3O_4$, copper (II) oxide CuO, or potassium permanganate $KMnO_4$ may be used, to be preferably used in combination with a $CO_2$ sorber. These materials may possibly be used in combination with oxidation catalysts such as Pt, Pd, Rh.

When the harmful substance is hydrogen in the gaseous phase, palladium oxide, cobalt oxide, ternary alloys among zirconium, vanadium and iron sold by the applicant under the name St 707, ternary alloys among zirconium, cobalt and rare earths, sold by the applicant under the name St 787, or more generally non-evaporable getter alloys or unsaturated organic compounds may be used.

When the harmful substances are saturated or unsaturated hydrocarbons, referring in particular but not exclusively to methane, propylene, ethane and propane, activated carbons having a large specific surface area, carbon nanotubes, oxidizing compounds like $KMnO_4$ or combinations thereof may be used.

When the harmful substance is oxygen, it is possible to use ternary alloys among zirconium, vanadium and iron sold by the applicant under the name St 707, ternary alloys among zirconium, cobalt and rare earths, sold by the applicant under the name St 787, or more generally non-evaporable getter alloys. Alternatively, metals may be used, among which nickel, copper, iron or reduced or partially reduced metal oxides are preferred, among which iron, nickel, tin or copper oxides or combinations thereof are preferred.

When the harmful substance is HF, oxides in general may be used, with particular reference to basic oxides, among which oxides of alkaline or alkaline-earth metals are preferred. Among these oxides the use of magnesium oxide is even more preferred.

The means for sorbing harmful substances suitable for the aims of the present invention may contain one or more getter materials depending on the harmful substance that must be removed from the battery. In particular, the expected composition of such substances produced during the operation of the battery may vary on the basis of the type of rechargeable battery and of its conditions of use, whereby it is possible to choose a mix of getter powders on the basis of the battery type in an optimum manner.

The rechargeable lithium batteries of the present invention may be made by arranging the permeable housing containing the getter material along one side of the battery, in a region of the battery free from electrodes, e.g. as shown in FIG. 3. In this case the structure of the rechargeable lithium battery 30 comprises a series of electrodes (in order not to jeopardize the understanding of the drawing only the two outermost electrodes 32, 32' have been illustrated) in the form of parallel metallic plates spaced apart by separators and immersed in an electrolytic solution (these members are not shown). On one side of this battery the permeable polymeric housing 33 is arranged, containing the getter material for the sorption of harmful gases. The electrical contacts 34 and 34' communicate the electrodes with the outside of the airtight container 31 of the battery.

FIG. 3 shows a preferred embodiment of a rechargeable lithium battery 30. Alternative and completely equivalent embodiments provide for the use of one or more permeable polymeric housings arranged along portions of the inner walls of the airtight container of the battery.

FIG. 4 shows a rechargeable lithium battery 40 similar to the one described with reference to FIG. 3 (the members of FIG. 4 having the same numerals of those of FIG. 3 are equal to those previously described), wherein a portion 43 for containing the means for the sorption of harmful substances is added to the structure of the battery, the means 45 comprising a getter material. As a matter of fact, portion 43 containing the permeable polymeric housing containing in turn the getter material for the sorption of harmful substances forms a portion of the airtight container of the battery, which portion is free from the members of the battery (electrodes, contacts, separators) but communicates with the inside of the battery along one side. If the permeable polymeric housing does not occupy the whole available volume of portion 43, a portion of the remaining volume is filled by the electrolyte.

Alternatively, the permeable housing containing the getter material may be inserted in the central portion of the rechargeable lithium battery, e.g. as shown in FIG. 5. In this case battery 50 has a cylindrical shape and a longitudinal section thereof taken along its axis is shown. The battery comprises an airtight container 51 whose electrodes 52 are in the form of thin sheets wound to form a spiral and immersed in a liquid electrolyte. A sectional view of these sheets is shown by means of parallel vertical lines close to each other. The separator arranged between the electrodes is not shown. Electrical contacts 54, 54' communicate the electrodes with the outside of the airtight container (in FIG. 5 the electrical contacts have been drawn as members separated from the electrodes for the sake of clarity only). The means 55 for the sorption of the harmful substances, consisting of a permeable polymeric housing containing the getter material is arranged in the central portion of this battery.

Figure 6:
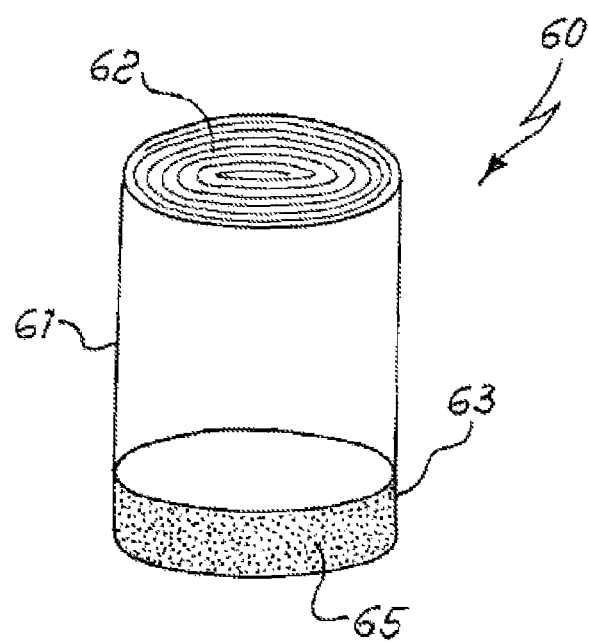
FIG. 6 shows a cross-sectional view of a preferred embodiment of the rechargeable lithium battery shown in FIG. 5.

Another preferred embodiment for this type of rechargeable lithium battery is shown in FIG. 6. In this case the battery, 60, still has a cylindrical shape and its electrodes are in the form of a wound spiral 62. In the lower part of an airtight container 61 a portion 63 is provided, which serves for accommodating the means 65 for the sorption of harmful substances, being also in this case in the form of a permeable polymeric housing containing the getter material.

This embodiment is particularly advantageous as there are no special geometrical limits due to the proximity of the means for the sorption of harmful substances to the electrical contacts.

In the embodiments shown in FIGS. 4 and 6 it is better to add a separating grid (not shown) between the portions 43 and 63 accommodating the permeable polymeric housing and the electrodes, in order to prevent these latter from damaging the polymeric housing thus causing the loss of the getter material contained therein. Such a grid must be electrically inert, as contacting the different electrodes it must not cause short-circuits among them.

The invention claimed is:

1. A rechargeable lithium battery comprising
an airtight container,
electrodes immersed in an electrolytic solution, said electrodes being spaced apart by one or more separators,
electrical contacts connected to the electrodes and
means for sorbing harmful substances comprising a polymeric housing, wherein the polymeric housing i) is permeable to said harmful substances but impermeable to electrolyte of the electrolytic solution ii) contains one or more getter materials for sorbing said harmful substances, and iii) is comprised of two welded polymeric sheets, wherein thickness of said polymeric sheets is comprised between 2 and 50 μm.

2. The rechargeable lithium battery according to claim 1, wherein the thickness of said polymeric sheets is comprised between 5 and 15 μm.

3. The rechargeable lithium battery according to claim 1, wherein said polymeric sheets have the same thickness.

4. The rechargeable lithium battery according to claim 1, wherein said getter materials are powders having a size comprised between 10 and 60 μm.

5. The rechargeable lithium battery according to claim 1, wherein said polymeric housing has a cylindrical shape and said getter materials are a single pill of compressed powders, the polymeric housing being in direct contact with the surface of the pill.

6. The rechargeable lithium battery according to claim 1, wherein said polymeric housing is made of a material chosen among polyolefins and fluorinated polymers.

7. The rechargeable lithium battery according to claim 6, wherein said polyolefins are chosen among polypropylene (PP), low-density polyethylene (LDPE), polystyrene and thermoplastic olefins (TPE).

8. The rechargeable lithium battery according to claim 6, wherein said polymeric housing is made of polytetrafluoroethylene (PTFE).

9. The rechargeable lithium battery according to claim 1, wherein said polymeric housing is made of ethyl-vinyl-acetate (EVA).

10. The rechargeable lithium battery according to claim 1, wherein said harmful substances comprise $H_2O$ and said getter material comprises one or more of: oxides of alkaline-earth metals, boron oxide and zeolites.

11. The rechargeable lithium battery according to claim 10, wherein said oxide of an alkaline-earth metal is calcium oxide.

12. The rechargeable lithium battery according to claim 1, wherein said harmful substances comprise $CO_2$ and said getter material comprises one or more of: carbon molecular sieves (CMS), hydroxides of alkaline or alkaline-earth metals or lithium salts identified by the formula $LiXO_y$, with X chosen among zirconium, iron, nickel, titanium, silicon and y comprised between 2 and 4, MOF modified by addition of basic functional groups.

13. The rechargeable lithium battery according to claim 12, wherein the basic functional groups comprise aminic groups.

14. The rechargeable lithium battery according to claim 1, wherein said harmful substances comprise CO and said getter material comprises one or more of the following compounds: cobalt oxide, copper oxide, and potassium permanganate.

15. The rechargeable lithium battery according to claim 14, wherein said getter material is used together with oxidation catalysts chosen among platinum, palladium and rhodium.

16. The rechargeable lithium battery according to claim 14, wherein said getter material is used together with a getter material for removal of $CO_2$.

17. The rechargeable lithium battery according to claim 1, wherein said harmful substances comprise saturated or unsaturated hydrocarbons and said getter material comprises one or more of: carbon nanotubes and oxidizing compounds.

18. The rechargeable lithium battery according to claim 17, wherein said oxidizing compounds comprise potassium permanganate ($KMnO_4$).

19. The rechargeable lithium battery according to claim 1, wherein said harmful substances comprise $O_2$ and said getter material comprises one or more of: ternary alloys among zirconium, vanadium and iron, ternary alloys among zirconium, cobalt and rare earths, and metals or reduced or partially reduced metal oxides.

20. The rechargeable lithium battery according to claim 19, wherein said metals are nickel, copper, iron, tin and combinations thereof.

21. The rechargeable lithium battery according to claim 19, wherein said reduced or partially reduced metal oxides are nickel oxide, copper oxide, iron oxide and combinations thereof.

22. The rechargeable lithium battery according to claim 1, wherein said harmful substances comprise HF and said getter material comprises oxides.

23. The rechargeable lithium battery according to claim 22, wherein said oxides are basic oxides.

24. The rechargeable lithium battery according to claim 23, wherein said basic oxides are oxides of alkaline or alkaline-earth metals.

25. The rechargeable lithium battery according to claim 24, wherein said alkaline-earth metal oxide is magnesium oxide.

26. The rechargeable lithium battery according to claim 1, wherein said harmful substances comprise hydrogen in a gaseous phase and said getter material comprises non-evaporable getter alloys.

27. The rechargeable lithium battery according to claim 1, wherein said harmful substances comprise hydrogen in a gaseous phase and said getter material comprises one or more among: palladium oxide, cobalt oxide, zirconium-vanadium-iron ternary alloys, and zirconium-cobalt-rare earths ternary alloys.

28. The rechargeable lithium battery according to claim 1, comprising one or more polymeric housings containing getter materials, wherein said polymeric housings are arranged along one or more portions of the inner walls of the airtight container.

29. The rechargeable lithium battery according to claim 1, wherein a portion of the airtight container is dedicated to accommodating said polymeric housing comprising getter materials.

30. The rechargeable lithium battery according to claim 29, wherein said portion for accommodating the polymeric housing comprising a getter material is separated from the residual portion of the battery by an electrically isolated grid.

* * * * *

UNITED STATES PATENT AND TRADEMARK OFFICE
CERTIFICATE OF CORRECTION

PATENT NO.       : 8,460,808 B2
APPLICATION NO.  : 12/600461
DATED            : June 11, 2013
INVENTOR(S)      : Toia et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 696 days.

Signed and Sealed this
Eighth Day of September, 2015

Michelle K. Lee
*Director of the United States Patent and Trademark Office*